(12) United States Patent
Kawano et al.

(10) Patent No.: US 11,048,382 B2
(45) Date of Patent: Jun. 29, 2021

(54) SCANNING SYSTEM, SCANNING PROGRAM, AND MACHINE LEARNING SYSTEM

(71) Applicant: SEIKO EPSON CORPORATION, Tokyo (JP)

(72) Inventors: Yo Kawano, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/519,055

(22) Filed: Jul. 23, 2019

(65) Prior Publication Data
US 2020/0034007 A1    Jan. 30, 2020

(30) Foreign Application Priority Data
Jul. 25, 2018  (JP) ............................. JP2018-139103

(51) Int. Cl.
G06F 3/0482   (2013.01)
G06F 3/12     (2006.01)
G06F 3/0481   (2013.01)
H04N 1/00     (2006.01)
H04N 1/04     (2006.01)
G06N 20/00    (2019.01)

(52) U.S. Cl.
CPC ........ *G06F 3/0482* (2013.01); *G06F 3/04817* (2013.01); *G06F 3/1297* (2013.01); *G06N 20/00* (2019.01); *H04N 1/00416* (2013.01); *H04N 1/00758* (2013.01); *H04N 1/04* (2013.01)

(58) Field of Classification Search
None
See application file for complete search history.

(56) References Cited

U.S. PATENT DOCUMENTS

| | | | | |
|---|---|---|---|---|
| 5,164,837 | A | * | 11/1992 | Hirosawa .................. H04N 1/40 358/296 |
| 5,177,625 | A | * | 1/1993 | Nakashima .............. G09B 7/02 358/468 |
| 5,477,308 | A | | 12/1995 | Ohnishi et al. |
| 5,821,936 | A | | 10/1998 | Shaffer et al. |
| 5,880,727 | A | * | 3/1999 | Barrett ............... H04N 1/00408 399/81 |
| 8,046,702 | B2 | | 10/2011 | Endoh |
| 2003/0185457 | A1 | * | 10/2003 | Campbell ............ H04N 1/4074 382/254 |
| 2004/0239959 | A1 | * | 12/2004 | Yada .................... H04N 1/3875 358/1.2 |

(Continued)

FOREIGN PATENT DOCUMENTS

| | | |
|---|---|---|
| JP | H06-178099 A | 6/1994 |
| JP | 2008-305264 A | 12/2008 |

(Continued)

*Primary Examiner* — Amy M Levy
(74) *Attorney, Agent, or Firm* — Global IP Counselors, LLP

(57) ABSTRACT

A scanning system includes: a configurator configured to make a first setting corresponding to an image captured by a pre-scan the setting of a process accompanying scanning based on learning results acquired by machine learning using training data related to a setting of the process accompanying scanning that is applied to a scanned image; and an executor that executes the process accompanying scanning based on the first setting.

4 Claims, 8 Drawing Sheets

(56) References Cited

U.S. PATENT DOCUMENTS

| | | |
|---|---|---|
| 2005/0054381 A1 | 3/2005 | Lee et al. |
| 2006/0187483 A1* | 8/2006 | Baba .................. H04N 1/00503 358/1.15 |
| 2007/0162872 A1 | 7/2007 | Hong et al. |
| 2009/0027706 A1* | 1/2009 | Nakajo .............. H04N 1/00427 358/1.9 |
| 2009/0064050 A1 | 3/2009 | Aono |
| 2009/0150830 A1 | 6/2009 | Ban et al. |
| 2010/0281374 A1 | 11/2010 | Schulz et al. |
| 2015/0092228 A1* | 4/2015 | Okabayashi ....... H04N 1/00411 358/1.15 |
| 2017/0336953 A1 | 11/2017 | King et al. |
| 2018/0150266 A1* | 5/2018 | Oguma ................ G06F 3/1285 |
| 2019/0253574 A1* | 8/2019 | Yamamuro ........ H04N 1/00482 |

FOREIGN PATENT DOCUMENTS

| | | |
|---|---|---|
| JP | 2015-114947 A | 6/2015 |
| WO | 2014/128709 A1 | 8/2014 |

* cited by examiner

SCANNING SYSTEM, SCANNING PROGRAM, AND MACHINE LEARNING SYSTEM

BACKGROUND

1. Technical Field

The present invention relates to a scanning system, a scanning program, and a machine learning system.

This application is based upon Japanese Patent Application 2018-139103 filed on Jul. 25, 2018, the entire contents of which are incorporated by reference herein.

2. Related Art

User interfaces that enable making various selections are common. For example, JP-A-2008-305264 describes technology enabling determining whether or not to display any of multiple selectable options in response to user operations.

The technology of the related art requires the user to perform an action in order to determine what to display in the user interface, and is not user friendly.

SUMMARY

An object of the present invention is to improve user friendliness and ease of use.

To achieve the foregoing object, a scanning system according to an aspect of the invention includes a configurator configured to derive a first setting corresponding to an image captured by a pre-scan, and configure a setting of a process accompanying scanning based on learning results acquired by machine learning using training data related to a setting of the process accompanying scanning that is applied to a scanned image; and an executor that executes the process accompanying scanning based on the first setting.

This configuration enables configuring settings related to a process accompanying scanning without user intervention. User convenience and ease of use can therefore be improved.

A scanning system according to another aspect of the invention also has a display controller configured to increase an order of preference of a setting included in the first setting above a defined order, and display multiple settings in locations corresponding to the order of preference on a screen selectably by a user; and the executor executes the process accompanying scanning based on the setting selected in the screen.

This configuration enable executing a process accompanying scanning using the desired settings by the user selecting settings displayed according the order of preference.

In a scanning system according to another aspect of the invention, when a setting of a process accompanying scanning is changed multiple times for the same image, the last setting made is related to the image as training data.

This configuration relates reflecting the setting actually applied to the image in the learning results.

In a scanning system according to another aspect of the invention, when a setting of a process accompanying scanning is changed after pre-scanning the image, the last setting made is related to the image as training data.

This configuration enables reflecting the setting actually used after pre-scanning in learning.

Another aspect of the invention is a machine learning system including a training data acquirer configured to acquire training data relating a setting of a process accompanying scanning to a scanned image; and a machine learning module configured to, based on the training data, train a model that outputs a setting of the process accompanying scanning based on image data input.

This configuration can train a model that automatically derives settings related to an image, and by deriving the settings by the model, can configure a process involving scanning without user intervention. User convenience and ease of use can therefore be improved.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below in the following order with reference to the accompanying figures.

(1) Configuration of a multifunction device
(2) Display control process
(3) Machine learning process
(4) Other embodiments

(1) Configuration of a Multifunction Device

Figure 1:
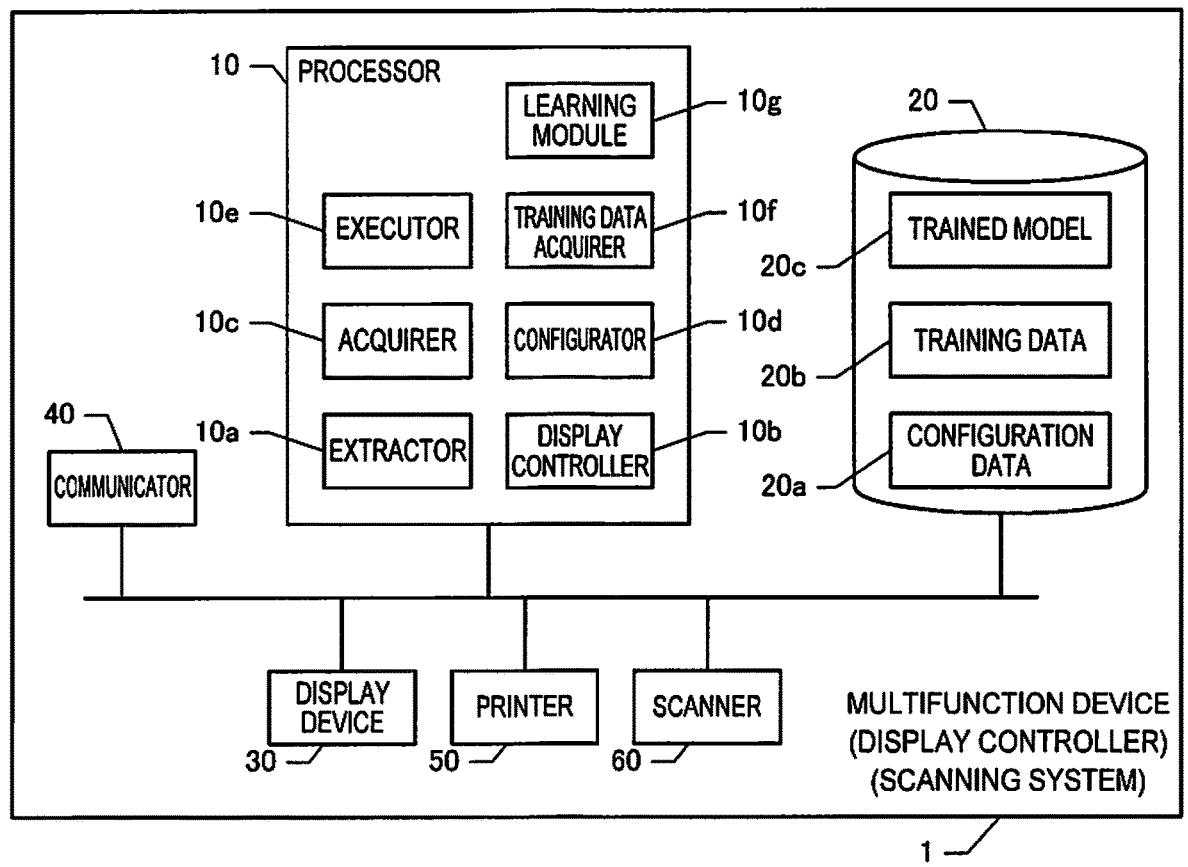
FIG. 1 is a block diagram illustrating the configuration of a multifunction device.

FIG. 1 is a block diagram illustrating the configuration of a multifunction device 1 according to a preferred embodiment of the invention.

The multifunction device 1 includes a processor 10, nonvolatile memory 20, a display device 30, a communicator 40, a printer 50, and a scanner 60.

The processor 10 includes devices such as a CPU, ROM, and RAM not shown, and controls parts of the multifunction device 1 by executing programs stored in nonvolatile memory 20.

The display device 30 in this example is a touch panel display, and has a display panel with a touch panel overlaid on the display panel. The display device 30 displays information on the display panel as controlled by the processor 10. The processor 10 in this embodiment of the invention can display on the display device 30 a user interface enabling the user to select possible choices (options), including choices for settings that can be set in the multifunction device 1, by touching the display.

The display device 30 also has a sensing mechanism for detecting contact (referred to below as touches) on the touch panel by the user's finger or a stylus. The processor 10 acquires the content of the user operation on the display device 30 based on the information acquired from the sensing mechanism.

The communicator 40 includes removable memory that is installed to the multifunction device 1, and an interface circuit for communicating with devices connected to the multifunction device 1 by wire or wirelessly.

The processor 10 can also acquire files recorded on devices connected through the communicator 40 as objects to print. The communicator 40 can also communicate through the interface circuit with external devices (such as multifunction devices), and can send and receive fax documents between the multifunction device 1 and external devices.

The printer 50 has actuators, sensors, drive circuits, and mechanical parts for printing on various types of print media by known printing methods such as inkjet printing and electrophotographic printing. In this embodiment of the invention the printer 50 can store documents (media) on each of multiple trays. The printer 50 has a conveyance mechanism for selecting documents stored in the trays one by one, conveying the document through a conveyance path, and discharging the document printed during the conveyance process. Note that in this example a document that the printer 50 selects from a tray and prints as the output document, and the size is referred to as the output document size.

The scanner 60 includes devices known from the literature for scanning documents, such as a color image sensor and light source, an actuator and drive circuits for conveying documents, a sensor for detecting the size of the document, and other mechanical parts. The sensor in this embodiment is a so-called line sensor, but may be an area sensor.

The scanner 60 also has a conveyance mechanism for selecting documents one by one from a document tray, conveying the document through the conveyance path, and discharging the document after scanning by illuminating the document with light from a light source. Note that in this embodiment the scanner 60 can scan one or both sides of a document.

In this embodiment the document set on the document tray of the scanner 60 is referred to as the set document, and the size of the set document as the set document size.

The processor 10 in this embodiment can control the scanner 60 to scan a document set on the document platen of the scanner 60, and can control the printer 50 to print the scanned image on the output document. In other words, the multifunction device 1 has a photocopy function. This means that the printer 50, scanner 60, and processor 10 can be said to configure a photocopier. The multifunction device 1 can also embody functions other than a copier function, but the embodiment described herein primarily focuses on the copier function.

Configuration data 20a, training data 20b, a trained model 20c, and programs not shown that are executed by the processor 10 are stored in the nonvolatile memory 20.

The configuration data 20a is data indicating settings for executing processes in the multifunction device 1. Settings in this example are parameters that are selected from multiple items. In the case of a copier function, for example, the settings include the color of the content recorded on the output document, the print density, type of image, output document size, copy ratio, printing surface, layout, and binding position settings.

The color of the recorded content can be set to either monochrome or color.

A numeric value (such as a value indicating a value (%) relative to a reference) indicating the density of the recorded content can be set as the print density.

The type of image can be set to text only, a combination of text and photograph, or photograph only.

The size (such as A4, A3, B4, or B5) of the output document can be set as the output document size.

Because the output document is stacked in a tray, and selection of a tray and output document size have the same meaning in this embodiment, the output document size setting may be which tray to use. In addition, because the print media of various types can be stored in the trays, the tray selection may be considered the same as the setting of the size and type of the output document.

The multifunction device 1 in this embodiment of the invention has five trays, referred to as tray 1 to tray 5, and output documents of a maximum five different sizes can be loaded in the multifunction device 1. If using an output document of a size not loaded in tray 1 to tray 5 is desired, the user must load an output document of the desired size to one of tray 1 to tray 5.

In this embodiment of the invention tray 1 to tray 5 are drawer-like mechanisms that can be pulled out to replace the documents held inside, and have mechanical parts. Therefore, to make a document of a size not held in tray 1 to tray 5 the output document, the user must pull one of tray 1 to tray 5 out and load the desired document. In other words, a task of changing the mechanical state of the multifunction device 1 is required.

When tray 1 to tray 5 are used without changing the output document stored therein in this embodiment, the multifunction device 1 can be operated without changing the mechanical state of the multifunction device 1. As a result, when an option from tray 1 to tray 5 is selected with the intention of using the output document already loaded in one of tray 1 to tray 5, a choice enabling operating the multifunction device 1 without changing the mechanical state of the multifunction device 1 is selected.

However, if one of tray 1 to tray 5 is pulled out and a document different from the document already installed is set in the tray and used, the multifunction device 1 will be operated after changing the mechanical state of the multifunction device 1. As a result, when an option from tray 1 to tray 5 is selected after pulling out one of tray 1 to tray 5 and loading a document different from the document already installed, a choice enabling operating the multifunction device 1 after changing the mechanical state of the multifunction device 1 is selected.

A value indicating the magnification for enlarging or reducing an image can be set as the copy ratio. The copy ratio may be set to any desired value or a fixed value, and in this embodiment of the invention can be set to the same size (copy ratio=100%), automatic (output document size or set document size), or a fixed ratio for enlarging or reducing from a fixed document size. The fixed document sizes are document sizes that are determined according to a specific standard, and in this embodiment are set to A4, A3, B4, B5, for example. Therefore, examples of fixed ratios for enlarging or reducing from a fixed document size include reduction from A3 to A4 (70%), and enlarging from B5 to B4 (141%).

Whether to print the images of the front and back of the set document to the front or back of the output document can be set as the printing surface. For example, whether to print from one side to one side, or to print from one side to both sides can be set.

Images of how many pages should be printed on one side of the document can be set as the layout. For example, the normal setting printing an image of one page to one page, or whether to print n-in-1 page to print images of n set documents (where n is an integer of two or more) to one document page can be selected.

The binding position enables setting where pages will be bound when printing a multiple page document. For example, the top left, left, top, or bottom left can be set as the binding position, and the layout of images printed on the back (second) side changes according to the binding position.

Various options can obviously also be set automatically. In this case, the settings are made based on default values or on information (such as the set document size) detected by sensors in the multifunction device 1. The configuration data 20a is data correlated to the value indicating, for each of the available settings, the setting of the currently selected option. More specifically, the configuration data 20a indicating the currently selected setting is defined and recorded in nonvolatile memory 20 by relating the value to the setting.

The training data 20b is data relating the scanned image data to settings for executing processes in conjunction with scanning based on the scanned image.

The trained model 20c is information indicating the method of deriving the correlation between the input data and output data, and in this embodiment of the invention is a model correlating image data to settings. The trained model 20c is a model acquired after machine learning. More specifically, the training model is trained by machine learning, and the model acquired by meeting a defined learning completion standard is the trained model 20c.

The processor 10 controls the parts of the multifunction device 1 based on programs recorded in nonvolatile memory 20. These programs include a scanning program that controls scanning in the multifunction device 1. The scanning program includes a display program controlling displaying on the display device 30. The functions of these programs enable the multifunction device 1 to function as a display controller and a scanning system. Because settings for processes executed by the multifunction device 1 are made in this example, the multifunction device 1 is the setting target device.

Various display objects can be displayed on the display device 30, and in this embodiment of the invention the display device 30 displays a user interface for configuring various settings in the multifunction device 1. A user interface for configuring settings is described below using copier settings as an example.

The processor 10 executes a scanning program for scanning documents, and the processor 10 executes a display control program for configuring the scanner settings. When these programs are executed, the processor 10 functions as a extractor 10a, display controller 10b, acquirer 10c, configurator 10d, executor 10e, training data acquirer 10f, and learning module 10g.

In this embodiment of the invention the user configures copier settings using the user interface presented on the display device 30. In this embodiment the user can select a setting from among multiple options and configure that setting. However, if all settings that can be selected for each option are displayed in the user interface at once, either a large display area is required or the icons representing the selectable options must be very small.

The processor 10 according to this embodiment therefore displays only part of the options that can be selected for multiple items in a first display screen that is first displayed as the user interface for inputting settings. Settings that are not presented in the first display screen can be configured in a second display screen that can be called from the first display screen.

To provide this type of user interface, the processor 10, using the functions of the extractor 10a, extracts the M options (where M is an integer greater than or equal to 2 and less than N) including the currently selected option from among N selection options according to an order of preference. In this example the selection option are any of the settings that can be selected for each item, and the total number of selection options that can be selected for each item is N (where N is an integer greater than or equal to 3). The processor 10 therefore selects a subset of the selection options that can be selected by a function of the extractor 10a. At this time the processor 10 always extracts the currently selected option. The processor 10 also extracts the selection options in descending order of preference. Note that because N and M are values specific to each item, the values of N and M may vary for different items.

The preference order indicates the order in which the selection options are presented in the first display screen, and in this embodiment of the invention the selection options are arranged from left to right. Therefore, the selection option on the left has higher preference than the selection option on the right. In this embodiment, the selection option that is currently selected always has the highest preference, and is always shown in the first display screen. As a result, the user can check the selection option that is currently selected on the multifunction device 1 by simply looking at the first display screen without needing to change to the second display screen. Note that because the currently selected option is the setting indicated by the configuration data 20a, the processor 10 acquires the currently selected setting indicated by the configuration data 20a for each item, and is treated as the currently selected option.

In this embodiment of the invention a specific order is defined for the preference order of each selection option (each setting) in each item. The processor 10 acquires by various methods described below the selection options with a lower order of preference than the currently selected option, but when the order of preference cannot be defined by these methods, may extract the selection options according to a defined order. The defined order is the order that is previously set independently of the state or usage history of the multifunction device 1. In one example the defined order is registered before the multifunction device 1 is shipped from the factory.

When the selection options are extracted, the processor 10, by a function of the display controller 10b, displays a user interface on the display device 30. More specifically, the processor 10 arranges the M selection options extracted by a function of the extractor 10a according to the order of preference to generate the first display screen.

In other words, the first display screen is a screen for displaying M selection options for each of the multiple items, and the processor 10, based on image data registered in the nonvolatile memory 20 and not shown, identifies the icons configuring the first display screen, and arranges and displays the selection options available for each item.

Figure 2:
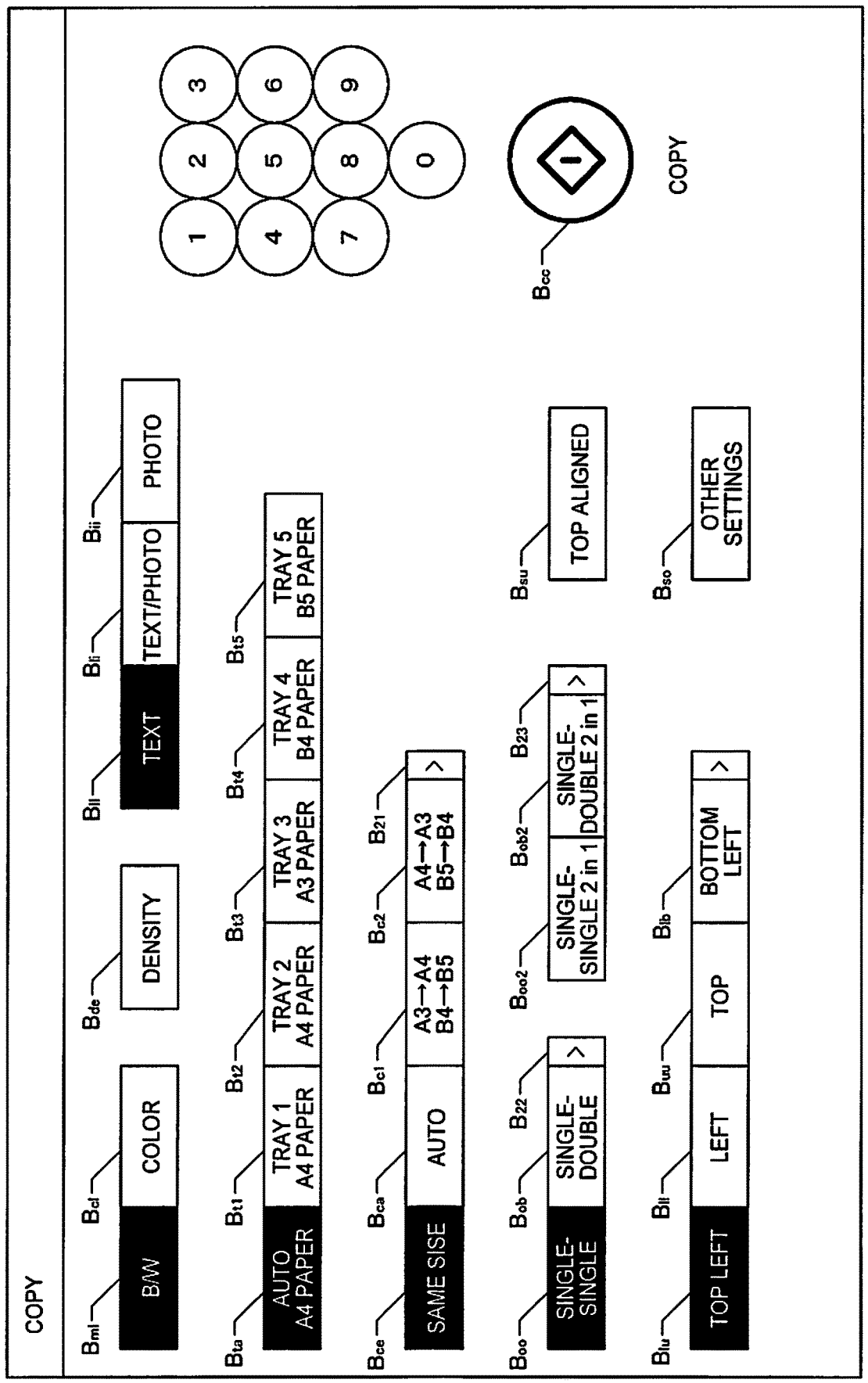
FIG. 2 shows an example of a first display screen.

FIG. 2 shows an example of a first display screen presented on the display device 30. In the example in FIG. 2, the selection options for each item are shown as text inside rectangles. In this example the selection options shown with white text on a black background are the currently selected options, and options shown with black text on a white background are the options not currently selected. The user can therefore confirm what selection options are currently selected from the first display screen.

Also in this example the order of preference of the selection options displayed furthest left in the area where the selection options for the same option are displayed is highest, and the order of preference decreases as the position moves to the right. Because the currently selected option always has the highest order of preference in this embodiment, the user can confirm the currently selected options with the selectable options organized in the first display screen so that the currently selected options are displayed at the display position of the highest preference option for each of the multiple items in the first display screen. As a result, the user can easily know what selection options are currently selected.

Furthermore, because the likelihood that the mechanical state of the multifunction device 1 will be changed every time the multifunction device 1 is used is low considering how the multifunction device 1 is used, the likelihood is high that selection options enabling operating the multifunction device 1 without changing a mechanical state will be selected when the multifunction device 1 is used.

The selection options indicated by tray 1 to tray 5 in this embodiment are selection options that make a document of the size stored in each tray 1 to tray 5 the output document. Therefore, a selection option that makes a document of a size that can only be used by pulling one of tray 1 to tray 5 out and loading a document of a size different from the existing documents is not shown in the first display screen.

As a result, in the first display screen, the order of preference of selection options that enable operating the multifunction device 1 without changing a mechanical state can be said to be higher than the selection options that enable operating the multifunction device 1 after changing a mechanical state. If the selection options are displayed in this order of preference, the preference order of the selection options more likely to be selected by the user is relatively high, making selection easier for the user.

Also in the example in FIG. 2, the rectangles indicating selection options for the same item are arranged adjacently to each other, and selection options for different items are displayed separated from other items. More specifically, in the first row in the first display screen, option $B_{ml}$ for setting the color of the recording material to monochrome, and the option $B_{cl}$ for setting the color of the recording material to color, are grouped together. Also in the top row is displayed an operator $B_{de}$ for moving to the second display screen to set the print density. Also in the top row is a selection option $B_{ll}$ for setting the type of image to text, a selection option $B_{li}$ for setting the type of image to text and photograph, and a selection option $B_{ii}$ for setting the type of image to photograph.

Note that setting the type of image is reflected in the resolution for scanning and printing. When selection option $B_{ll}$ for setting the type to text is set, scanning and printing are done at a low resolution. When selection option $B_{ii}$ for setting the type to photograph is selected, scanning and printing are done at a high resolution. When selection option $B_{li}$ for setting the type to text and photograph is selected, the document is scanned at high resolution, the image is analyzed to determine whether it is text or a photograph, printing is done at a low resolution if text is identified, and printing is done at a high resolution if a photograph is identified.

The second row in the first display screen has selection option $B_{ta}$ for automatically setting the output document size, and selection options $B_{t1}$ to $B_{t5}$ for setting the output document size to the size of the documents loaded in tray 1 to tray 5.

The third row in the first display screen has selection option $B_{ce}$ for setting the copy ratio to same size (100%), selection option $B_{ca}$ for setting the copy ratio automatically, selection option $B_{c1}$ for setting the copy ratio to 70%, and selection option $B_{c2}$ for setting the copy ratio to 141%.

Note that there may obviously be other selection options for setting the copy ratio, and if the user operates selection operator $B_{21}$ shown adjacent to selection option $B_{c2}$, the user can set the copy ratio to another setting in the second display screen.

On the fourth row in the first display screen are selection option $B_{oo}$ for setting the printing surface from single side to single side, and selection option $B_{ob}$ for setting the printing surface from single side to double side.

Note that there may obviously be other selection options for setting the printing surface, and if the user operates selection operator $B_{22}$ shown adjacent to selection option $B_{ob}$, the user can set the printing surface to other settings in the second display screen.

Also on the fourth row in the first display screen are selection option $B_{oo2}$ for setting the layout to 2in1 when the printing surface is set to single side to single side, and selection option $B_{ob2}$ for setting the layout to 2in1 when the printing surface is set to single side to double side.

Note that there may obviously be other selection options for setting the layout, and if the user operates selection operator option $B_{23}$ shown adjacent to selection option $B_{ob2}$, the user can set the layout to other settings in the second display screen.

Also on the fourth row in the first display screen is selection option $B_{su}$ for setting the orientation of the set document set for scanning by the scanner to top aligned. Note that setting the set document on the document platen of the scanner 60 so that the top edge of the set document (the edge located at the top when the document is positioned for reading with the text on the document oriented for normal reading) is aligned with the side of the document platen that is away from the user when the user is looking at the document platen is referred to as top aligned.

The orientation when the document is placed so that the top edge of the set document is aligned with the left side of the document platen as seen from the user position is referred to as left aligned.

On the fifth row in the first display screen are selection option $B_{lu}$ for setting the binding position to the top left, selection option $B_{ll}$ for setting to the left, selection option $B_{uu}$ for setting to the top, and selection option Bib for setting to the bottom left. Also on the fifth row in the first display screen is selection option $B_{so}$ for setting an item not included in the first display screen.

Various icons for selecting items or actions other than selection options for selecting copier settings are also displayed in the first display screen, including a button $B_{cc}$ for starting copying, for example. The user can assert various instructions to the multifunction device 1 through the selection options, operators, and buttons described above.

When the user selects a desired option from the first display screen, the processor 10, by a function of the display controller 10b, identifies the selected setting based on the output of the display device 30, and changes the currently selected option by updating the configuration data 20a. The processor 10 also changes the preference order of the selection option that was newly selected to the highest preference. The processor 10 also lowers by one the preference order of the selection options that had a higher preference than the newly selected selection option. By a function of the display controller 10b, the processor 10 then also updates the first display screen based on image data not shown that is registered in the nonvolatile memory 20 by rearranging the selection options on the first display screen according to the new order of preference.

As described above, not all of the selectable settings related to the copy ratio, printing surface, and layout parameters are displayed in the first display screen, and only a subset of settings are displayed. For example, because only four selection options are presented for the setting the copy ratio, variable M is 4 and N is 5 or more (there may be a copy ratio setting of 86% for reducing an A4 size document to a B5 size document, for example).

In this example, M selection options, where M is less than N, are selectably displayed in the copy ratio, printing surface, and layout parameter items in the first display screen. In addition, the user can invoke the second display screen by operating selection operators B21, B22, or B23 in these items, and thereby can select settings indicated by the remaining selection options.

More specifically, when the user operates operators $B_{21}$, $B_{22}$, or $B_{23}$ in the first display screen, the processor 10, by a function of the display controller 10b, identifies the operator that was operated based on output from the display device 30, and identifies the items for settings to display in the second display screen. Also by a function of the display controller 10b, the processor 10 identifies, based on image data not shown that is registered in the nonvolatile memory 20, the icons and display objects configuring the second display screen, and controls the display device 30 to display a second display screen showing the icons as selection options.

Figure 3:
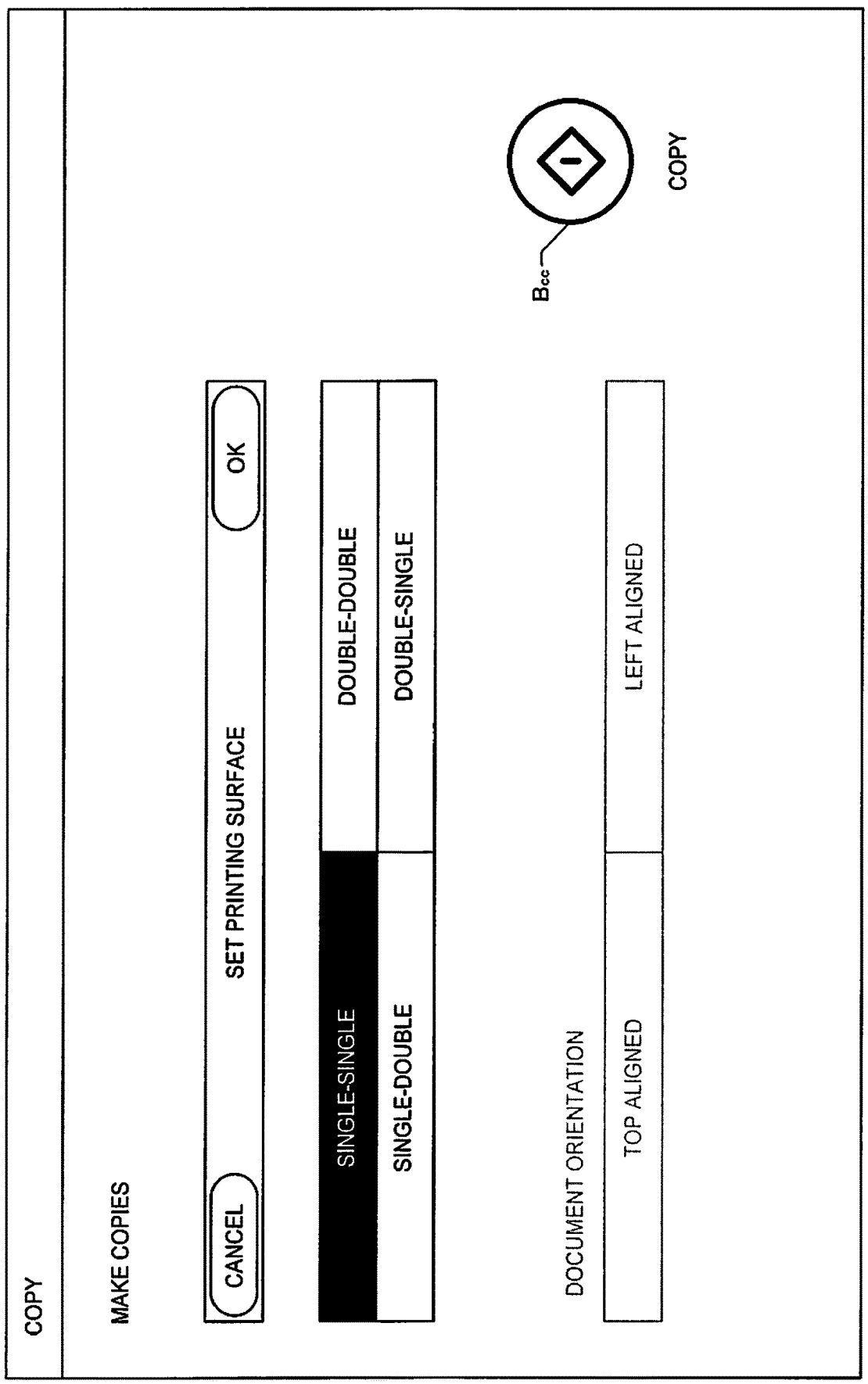
FIG. 3 shows an example of a second display screen.

FIG. 3 shows an example of a second display screen displayed by the display device 30. The example in FIG. 3 shows a second display screen for selecting the printing surface setting. The second display screen shown in FIG. 3 is displayed in response to the user operating operator $B_{22}$. The selection options are also displayed as text inside rectangles in the second display screen shown in FIG. 3. As described above, the selection options shown with white text on a black background are the currently selected options, and options shown with black text on a white background are the options not currently selected. Selection options that can be selected and selection options that cannot be selected are shown in the second display screen, and the selection options that cannot be selected are grayed out.

All selection options available in the setting of the printing surface, which is the corresponding setting, are displayed in the second display screen shown in FIG. 3. Because the selection options displayed in the first display screen can be set without displaying the second display screen, those settings may be omitted from the second display screen. However, because presenting all selection options in one place so that the user can select the desired option is more user friendly, all selection options related to the setting of the printing surface are shown in the second display screen in this example.

Various icons for selecting items or actions other than selection options for selecting copier settings are also displayed in the second display screen, including a button $B_{cc}$ for starting copying, for example. The second display screen shown in FIG. 3 also includes text indicating that the items for selection from the second display screen are printing surface settings, an operator for cancelling making settings on the second display screen, and an operator (OK button) for confirming the setting made on the second display screen.

When the user selects a desired option from the second display screen, the processor 10, by a function of the display controller 10b, identifies the selected setting based on the output of the display device 30, and changes the currently selected option by updating the configuration data 20a. The processor 10 also changes the preference order of the selection option that was newly selected to the highest preference. The processor 10 also lowers by one the preference order of the selection options that had a higher preference than the newly selected selection option.

When the user selects the selection option (OK button) for confirming the setting in the second display screen, the processor 10, by a function of the display controller 10b, updates the first display screen based on image data not shown that is registered in the nonvolatile memory 20 by rearranging the selection options on the first display screen according to the new order of preference.

When the user selects from the second display screen a selection option that was not previously shown in the first display screen, the option selected in the second display screen is shown in the first display screen as the currently selected option. More specifically, in response to an operation calling the second display screen from the first display screen, a second display screen containing selection options not shown in the first display screen is displayed. When a selection option is selected from the second display screen, the option that was selected is shown in the first display screen as the currently selected option.

For example, suppose that as shown in FIG. 2 the preference order of the printing surface settings is selection option $B_{oo}$ for setting the printing surface to single side to single side, and then selection option $B_{ob}$ for setting single side to double side, and operator $B_{22}$ is then operated.

In this case, the processor 10 displays a second display screen as shown in FIG. 3 on the display device 30. The selection option of the setting currently selected in the first display screen, that is, the selection option of the setting for printing from single side to single side, is therefore also selected in the second display screen.

Figure 4:
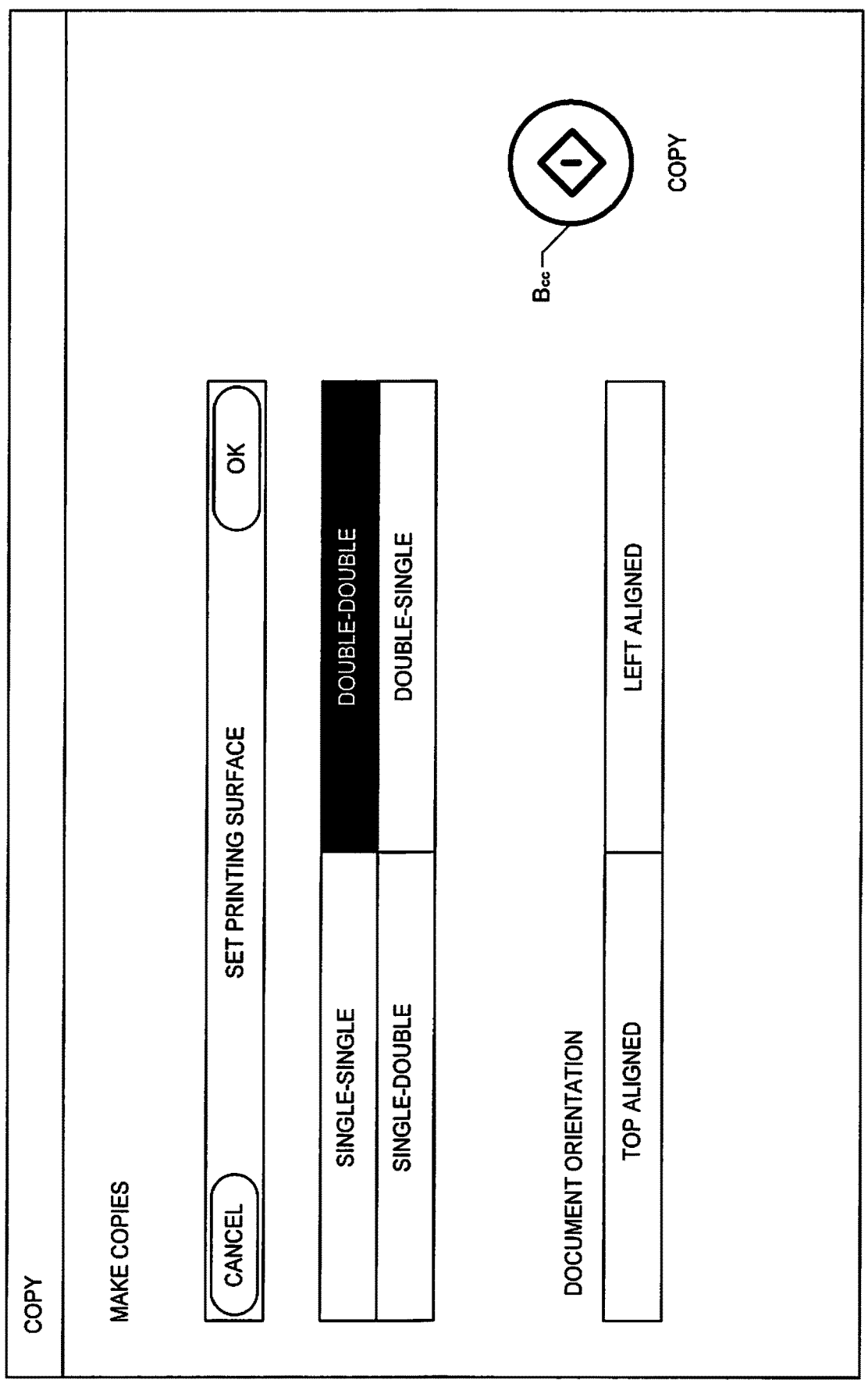
FIG. 4 shows an example of a second display screen.

If the user then selects the selection option of the setting for printing from double side to double side as shown in FIG. 4, the processor 10 changes the background of the original selection option to white and the text to black, and changes the background of the current (new) selection option to black and the text to white. This display state is the state when the currently selected option is a provisional selection (the configuration data 20a has not been undated), and this provisional selection state is shown in FIG. 4.

In this embodiment, when the set document is double sided, the direction of the layout may change according to the direction in which the document is set (the document orientation), and the orientation of the document can be selected from the second display screen. The selection options for setting the document orientation are therefore not grayed out and can be selected in the example shown in FIG. 4.

If the user then selects the selection option (OK button) for confirming the settings in this state, the processor 10 updates the configuration data 20a and changes the setting from printing from double sided to double sided to the current setting. The processor 10 then displays the first display screen changed to reflect the current settings on the display device 30.

Figure 5:
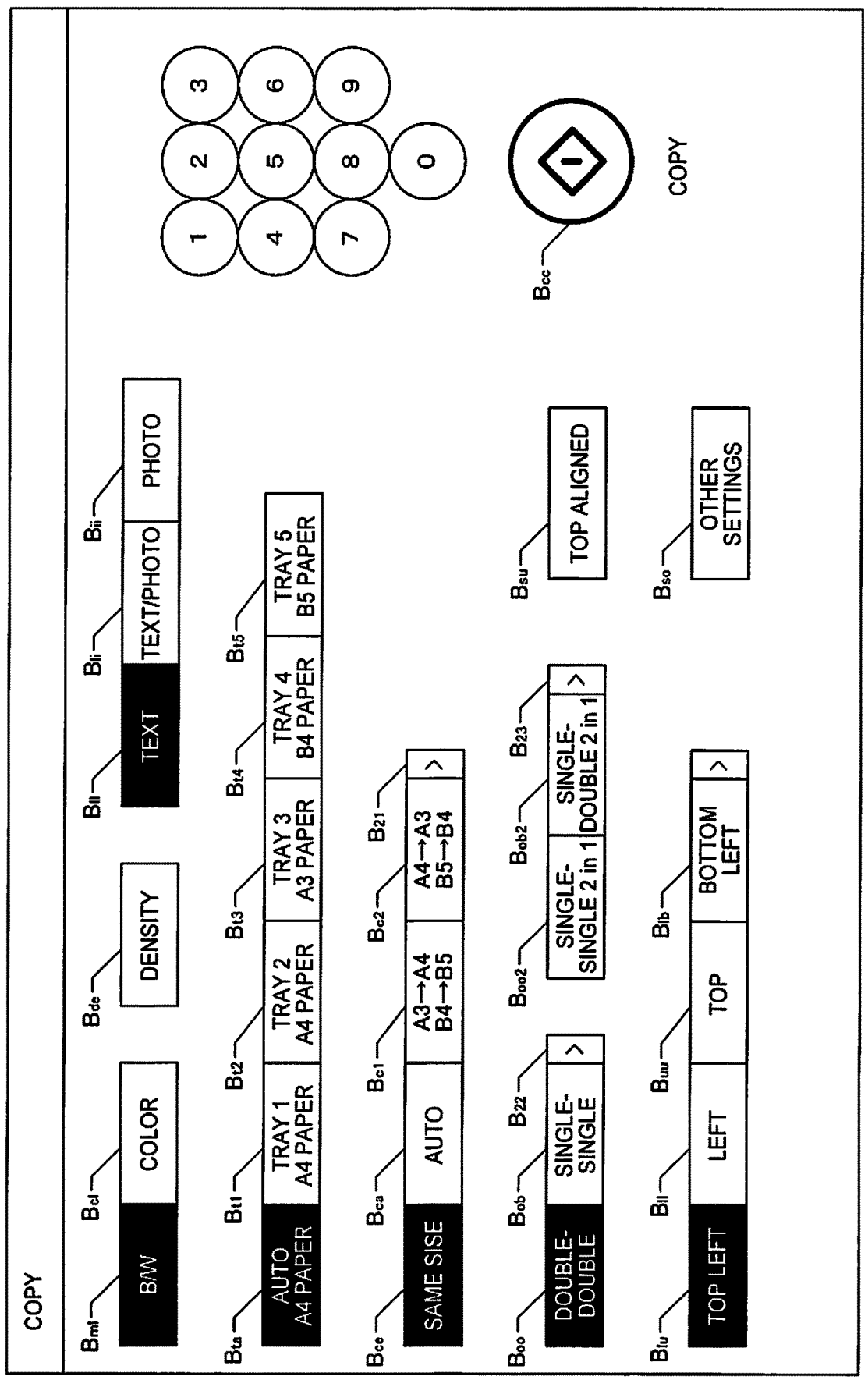
FIG. 5 shows an example of a first display screen.

FIG. 5 shows an example of the updated first display screen.

When the user selects button $B_{cc}$ for starting printing in the first display screen, the currently selected settings are confirmed. More specifically, the processor 10, by a function of the configurator 10d, references the configuration data 20a and acquires the settings indicated by the configuration data 20a. Next, by a function of the executor 10e, the processor 10 applies the settings and produces a copy, which is a processing involving scanning. More specifically, the processor 10 controls the scanner 60 according to the settings indicated by the configuration data 20a controls the conveyance mechanism to scan. The processor 10 also controls the printer 50 according to the settings indicated by the configuration data 20a, selects the output document size, controls the conveyance mechanism, applies image processing, and prints. As a result, an output document that is a copy of the set document placed on the document platen of the scanner 60 is acquired.

In an embodiment such as described above, the selection options that are currently selected, and selection options other than the currently selected options, are displayed in the first display screen. The user can therefore check the selection options that are currently selected and other selection options without the user performing any operation, and user friendliness and ease of use are improved. All (N) selection options are also not displayed, and only a subset (M) of selection options are displayed, in the first display screen. As a result, selection options can be displayed without excessive reduction in size in the limited display area of the display device 30.

When a setting desired by the user is not included in the M selection options in the first display screen, the user can select the desired selection option from a second display screen that is displayed in response to the user operating an operator $B_{21}$, $B_{22}$, $B_{23}$. When an option is selected in the second display screen and the selection option (OK button) for confirming the setting is selected, the selection option that was selected is displayed in the first display screen as the currently selected option. The user can therefore know from the first display screen whether or not the settings are as intended. The foregoing also applies to second display screens displayed for other settings.

(2) Display Control Process

Figure 6:
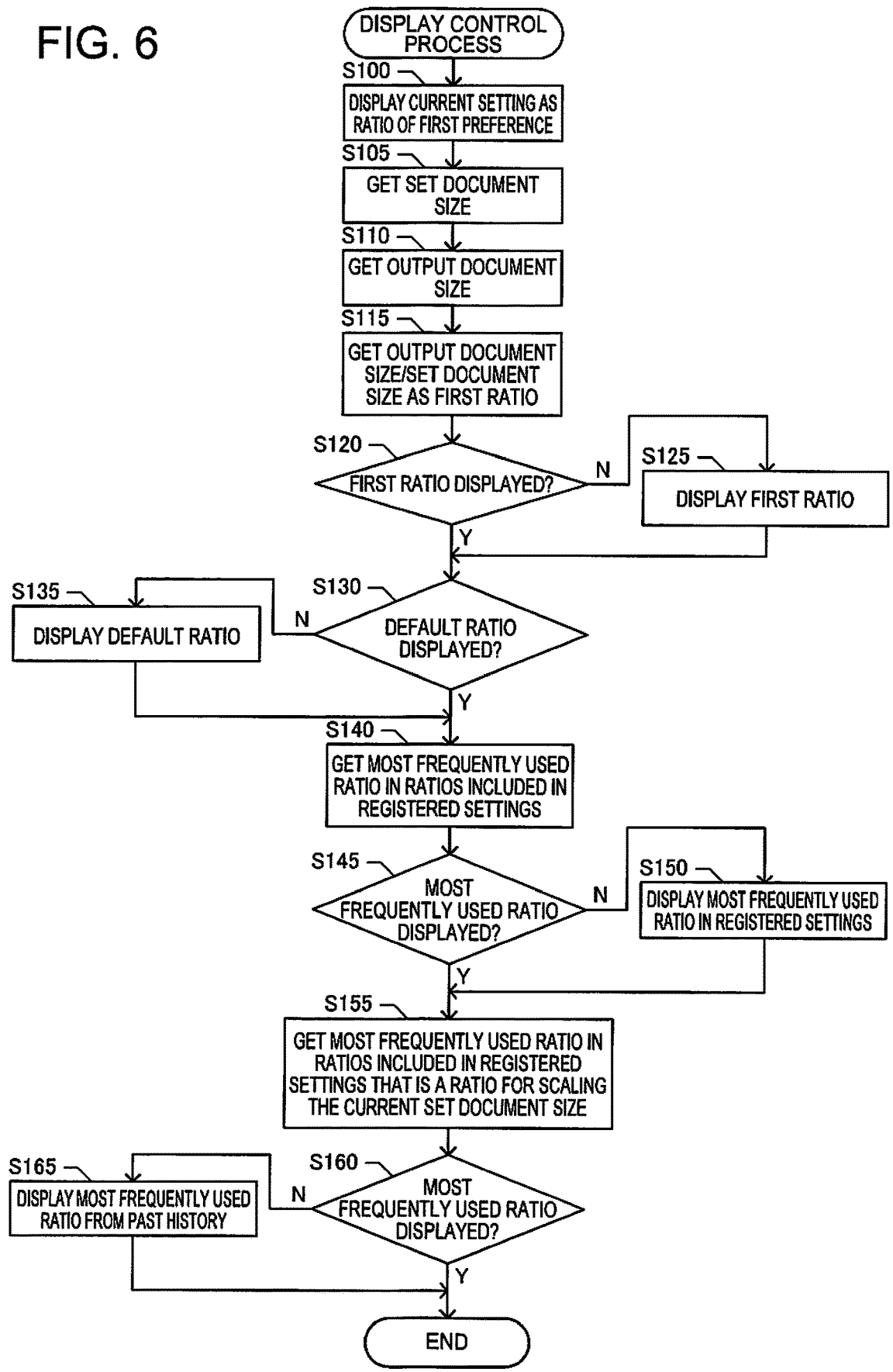
FIG. 6 is a flow chart of a display control process.

The display control program that displays a user interface for configuring settings in the multifunction device 1 is described next. This description focuses on the process related to displaying copy ratio settings. FIG. 6 is a flow chart of the process related to displaying copy ratio settings.

when the user starts the copier process through a user interface not shown displayed on the display device 30, the processor 10, by a function of the display controller 10b, executes a process of displaying a first display screen such as shown in FIG. 2 on the display device 30.

To display the first display screen, the processor 10 executes the process shown in FIG. 6 in relation to setting the copy ratio. In this process, the processor 10, by a function of the display controller 10b, displays the current copy ratio setting as the copy ratio of first preference (step S100).

More specifically, the processor 10 looks up the copy ratio in the configuration data 20a, and acquires the currently selected setting as the current setting. The processor 10 then treats this setting as the copy ratio of first preference, and displays the selection option indicating the selected setting at the left end of the area displaying copy ratios in the first display screen. At this time the processor 10 displays the background of the selection option black and the text white. For example, if the currently selected setting is same size, the selection option indicating the same-size setting as shown in FIG. 2 at the position on the left end.

Next, the processor 10, by a function of the acquirer 10c, acquires the set document size (step S105). More specifically, the processor 10, based on the output of sensors in the scanner 60, acquires the size of the set document set on the document platen.

Next, the processor 10, by a function of the acquirer 10c, acquires the output document size (step S110). More specifically, the processor 10 references the configuration data 20a, acquires the currently selected setting for the output document size item, and uses this as the output document size.

Next, the processor 10 acquires as a first ratio the ratio acquired by dividing the output document size by the set document size (step S115). More specifically, the processor 10 acquires as the first ratio the copy ratio when the set document set on the document platen of the scanner 60 is copied to an output document of the output document size currently being selected.

Next, the processor 10, by a function of the display controller 10b, determines whether or not the first ratio is already displayed (step S120). More specifically, the processor 10 compares the current copy ratio already displayed in step S100 with the first ratio acquired in step S115, and if they are the same determines that the first ratio is already displayed.

If in step S120 the first ratio is determined to not be displayed, the processor 10, by a function of the display controller 10b, displays the first ratio (step S125). More specifically, the processor 10 displays a selection option for setting the first ratio in the second position from the left end of the area showing the copy ratio selection options in the first display screen. At this time the processor 10 displays the background of the selection option white and the text in black. In the example in FIG. 2 the first ratio is equivalent to the ratio that is set automatically.

More specifically, because the copy ratio required to copy the set document that is set to the currently selected output document is set automatically, the selection option indicating the first ratio in this embodiment is expressed as Automatic in the first screen. If in step S125 Automatic is the first ratio, a selection option indicating Automatic is displayed on the right side adjacent to the selection option indicating a same size copy as shown in the example in FIG. 2.

Note that because a copy can be made without pulling out a tray of the multifunction device 1 when copying the set document that is set to the currently selected output document, the selection option indicating the first ratio is a selection option enabling operating without changing the mechanical state of the multifunction device 1.

If in step S120 the first ratio is already displayed, the processor 10 skips the step of displaying the first ratio. In other words, this embodiment is configured so that duplicate selection options are not displayed.

Next, the processor 10, by a function of the display controller 10b, determines whether or not the default copy ratio is already displayed (step S130). In this embodiment the default copy ratio is the copy ratio (setting) the user previously set as the default, and is previously registered in nonvolatile memory 20. The default copy ratio may be previously set. For example, when the multifunction device 1 is shared in the workplace, a copy ratio that is used by many users may be set as the default copy ratio.

When the default copy ratio matches the current setting or the first ratio, the selection option for setting the default copy ratio is already displayed. Therefore, the processor 10 determines whether or not the default copy ratio is already displayed in step S130.

If the default copy ratio is not already displayed, the processor 10, by a function of the display controller 10*b*, displays the default copy ratio (step S135). More specifically, the processor 10 displays a selection option for setting the default copy ratio at the position on the right side adjacent to the selection option that is already displayed in the area showing the selection options for the copy ratio in the first screen.

If in step S130 the default copy ratio is already displayed, step S135 is skipped. As a result, a new selection option for setting the default copy ratio is not displayed. For example, if the default copy ratio is the same size setting in the example in FIG. 2, the default copy ratio is already displayed as the currently selected option, and a new selection option for setting the default copy ratio will not be added.

Next, the processor 10, by a function of the display controller 10*b*, acquires the copy ratio included in the registered settings that is the most frequently copy ratio (step S140).

In this embodiment the registered settings are a combination of settings (selection options) that are often used for the multiple setting items, and are predefined and registered in nonvolatile memory 20. This embodiment considers the most frequently used of the copy ratios included in the registered settings as a copy ratio that is often used, and is configured to raise the preference order of that copy ratio. Therefore, the processor 10 acquires the most frequently used copy ratio by referencing the nonvolatile memory 20, and counting the output frequency of the copy ratios included in the multiple registered settings.

Next, the processor 10, by a function of the display controller 10*b*, determines whether or not the most frequently used copy ratio acquired in step S140 is already displayed (step S145). If step S145 determines the most frequently used copy ratio acquired in step S140 is not already displayed, the processor 10, by a function of the display controller 10*b*, displays the most frequently used copy ratio in the registered settings (step S150).

More specifically, the processor 10 displays a selection option for setting the most frequently used copy ratio that was acquired in step S140 at the position on the right side adjacent to the selection option that is already displayed in the area showing the selection options for the copy ratio in the first screen. FIG. 2 shows an example displayed in the user interface when the copy ratio (70%) for reducing from A3 to A4 is the most frequently used copy ratio in the registered settings.

If in step S145 the most frequently used copy ratio acquired in step S140 is already displayed, step S150 is skipped. As a result, a new selection option for setting the most frequently used copy ratio acquired in step S140 is not displayed.

This embodiment of the invention can therefore display in the user interface the most frequently used copy ratio in the copy ratios included in the registered settings. This example can therefore predict copy ratios that are often used based on registered settings that are registered by the user, and can display a selection option for setting the predicted copy ratio.

Next, the processor 10, by a function of the display controller 10*b*, acquires the most frequently used copy ratio in the copy ratios included in a history of past settings that is also a copy ratio for scaling the current set document size (step S155).

The copy ratios included in the history of past settings (selection options that were selected for an operation in the past) can be presumed to be copy ratios that the user is likely to use again. However, the likelihood that a copy ratio that differs from the copy ratios for scaling the set document sizes that are already set on the document platen of the scanner 60 is low. For example, a copy ratio that differs from the values used when copying from a set document size to a defined output document size can be said to have a low likelihood of being used when a document is already set.

The processor 10 therefore acquires the set document size that is set on the document platen of the scanner 60, and acquires the copy ratio for scaling the set document size. The processor 10 also references the nonvolatile memory 20 to reference the history of settings that were used when operating the multifunction device 1 in the past, and counts the output frequency of the copy ratios included in the history. The processor 10 then acquires the most frequently used copy ratio that is also a copy ratio for scaling a set document size from the copy ratios included in the history.

Next, the processor 10, by a function of the display controller 10*b*, determines whether or not the most frequently used copy ratio acquired in step S155 is already displayed (step S160). If in step S160 the most frequently used copy ratio acquired in step S155 is not already displayed, the processor 10, by a function of the display controller 10*b*, displays the most frequently used copy ratio in the past history that was acquired in step S155 (step S165).

More specifically, the processor 10 displays a selection option for setting the most frequently used copy ratio that was acquired in step S155 at the position on the right side adjacent to the selection option that is already displayed in the area showing the selection options for the copy ratio in the first screen. FIG. 2 shows an example displayed in the user interface when the copy ratio (141%) for enlarging from A4 to A3 is the most frequently used copy ratio in the past history that was acquired in step S155.

However, if in step S160 the most frequently used copy ratio acquired in step S155 is already displayed, step S165 is skipped. As a result, a new selection option for setting the most frequently used copy ratio acquired in step S155 is not displayed.

This embodiment of the invention can therefore display in the user interface the most frequently used copy ratio among the copy ratios in the past history for scaling the set document size. This example can therefore display a selection option for setting a copy ratio that is a copy ratio the user often uses and has a high probability of actually being used.

In the process described above, the currently selected option is displayed, and then, as shown in FIG. 6, and then sequentially determines whether or not to display the first ratio, default copy ratio, the most frequently used copy ratio in the registered settings, or the most frequently used copy ratio in the past history. Therefore, this decision sequence in this embodiment is the preference order as long as there are selection options to display. If a selection option to display matches a selection option that is already displayed, or there are no selection options to display, the preference order changes. Therefore, the number of selection options displayed simultaneously is not limited to four as shown in the example in FIG. 2, and there may be a different number.

Furthermore, in the embodiment described above the preference order of the selection options is determined and is registered as a defined order before the multifunction device 1 is shipped from the factory. However, once using the multifunction device 1 starts, there are the registered settings as described above and a history of past settings. As a result, the preference order of the selection options of the settings differs from the predefined order, and the preference order of the most frequently used copy ratios among the copy ratios included in the registered settings, and the most frequently used copy ratios among the copy ratios included in the history of past settings that are also copy ratios that scale the current set document size, rise above the predefined order. Therefore, in this embodiment of the invention the order of preference of not only the first ratio acquired in step S115, but also a second copy ratio that differs from the first ratio, rises above the predefined order As a result, of being often selected by the user.

This configuration therefore adjusts the order of preference of the first ratio and second ratio, which are copy ratios to display, without requiring user intervention. User convenience and ease of use can therefore be improved.

(3) Machine Learning Process

In the embodiment described above the order of preference is determined based on mechanical state of the multifunction device 1, for example, and the selection options with the M highest preference order are displayed, but the order of preference may be determined by other methods. Machine learning is one example of such other methods.

The multifunction device 1 according to this embodiment functions as a machine learning system. More specifically, when a process involving scanning executes, the multifunction device 1 acquires training data correlating the settings of the process accompanying scanning to the scanned image. Settings can then be made by machine learning based on the training data.

The processor 10 functions as a training data acquirer 10*f* and learning module 10*g*, and can process functions related to machine learning, by running a machine learning program not shown that is stored in nonvolatile memory 20.

The processor 10 can execute a function of acquiring training data 20*b* by a function of the training data acquirer 10*f*. When a function involving scanning executes in this embodiment, the processor 10 relates the scanned image to the settings as training data 20*b*, and stores the training data 20*b* in nonvolatile memory 20.

Note that an untrained user may not know what kind of settings are required to obtain the desired result, and may change settings repeatedly for the same image.

Therefore, when the settings for a process involving scanning are repeatedly changed for the same image in this example, the processor 10 relates the last settings made to that image as the training data 20*b*. The settings made before the last settings are not used as training data 20*b*.

Note that the processor 10 determines whether or not settings were changed multiple times for the same image based on comparing the scanned images, and determining whether or not the difference is less than or equal to a reference and a combination of different settings was applied for each image. A configuration that determines whether or not settings changed for only settings that were applied within a specific period of time.

A configuration in which a process accompanying scanning is executed in the multifunction device 1 after making a pre-scan is also conceivable. In this case, there may be only one pre-scan even when the settings are changed multiple times. In this event, the processor 10 relates the last settings made to the image acquired by the pre-scan as the training data 20*b*. Settings made before the last settings are not used for the training data 20*b*.

Note that the image after the pre-scan may be used for the process accompanying scanning, or scanning may be repeated before the process accompanying scanning.

As processes accompanying scanning execute, the images acquired by scanning are correlated to the settings applied when the process executes, and the training data 20*b* gradually accumulates. As the training data 20*b* accumulates, a model for predicting the settings from the image can be built by machine learning.

Figure 7:
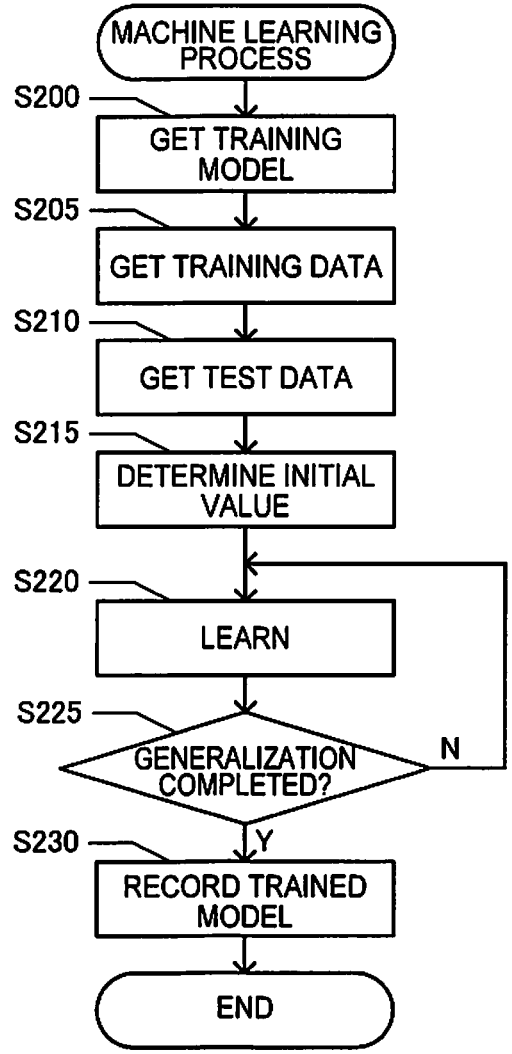
FIG. 7 is a flow chart of a machine learning process.

FIG. 7 is a flow chart of the machine learning process. The machine learning process may be executed at any time after a specific amount of training data 20*b* has accumulated. When the machine learning process starts, the processor 10, by a function of the learning module log, acquires a training model (step S200). The model is information expressing an algorithm for deriving the relationship between predictive data and prediction result data. In this embodiment the predictive data is the scanned image data (or data derived from the image data (such as features of the image)), and is described using a model in which data indicating the settings for each setting item is predictive data.

Figure 8:
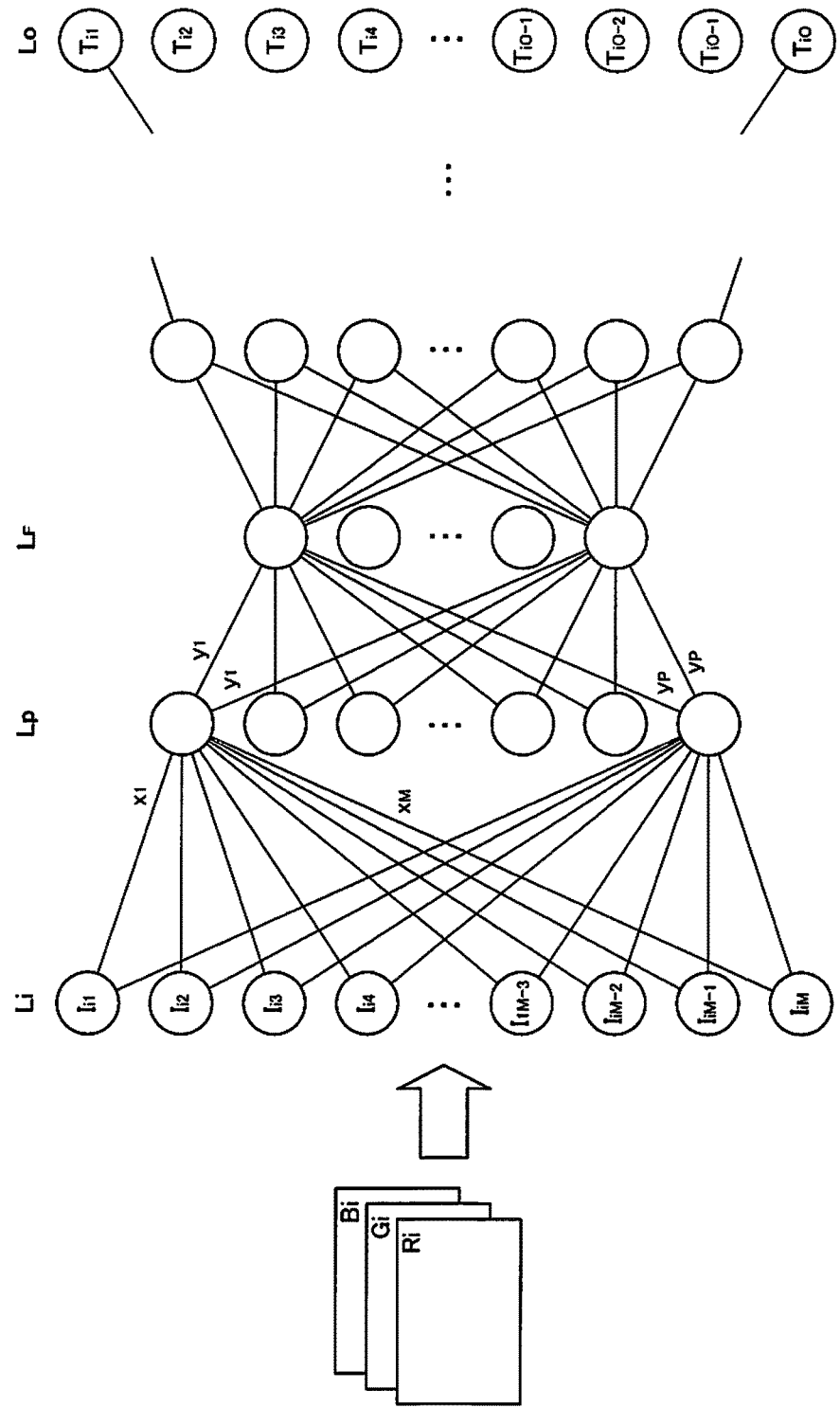
FIG. 8 schematically illustrates the configuration of a neural network.

Limited to changing input data to output data, the model can be defined in many ways. FIG. 8 schematically illustrates the configuration of a neural network as an example of a model used in this embodiment of the invention. In FIG. 8 nodes representing neurons are shown as circles, and connections between nodes are indicated by the solid lines. Note that only a subset of node and connections are shown for simplification. Also in FIG. 8, nodes associated with the same layer are aligned vertically, the layer at the left end is input layer Li, and the layer at the right end is output layer Lo.

In the relationship between two layers, the layer closer to the input layer Li is called the higher layer, and the layer closer to the output layer Lo is called the lower layer. More specifically, for any given layer, the output of the layer one layer higher is the input, and the output is by applying a weight to the inputs, adding bias, and applying an activation function.

For example, when the number of nodes on layer $L_P$ in FIG. 8 is P, the input data to each lode of layer $L_P$ is $x_1, \ldots x_M$, the biases are $b_1, \ldots b_P$, the weights applied to node K of layer $L_P$ are $w_{k1}, \ldots w_{kM}$, and the activation function is h (u), the intermediate outputs $u_1, \ldots u_P$ of each lode on layer $L_P$ are expressed by equation (1) below.

$$(u_1 \ldots u_k \ldots u_P) = (x_1 \ldots x_k \ldots x_M) \begin{pmatrix} w_{11} & \ldots & w_{k1} & \ldots & w_{P1} \\ & & \vdots & & \\ w_{1k} & \ldots & w_{kk} & \ldots & w_{Pk} \\ & & \vdots & & \\ w_{1M} & \ldots & w_{kM} & \ldots & w_{PM} \end{pmatrix} + (b_1 \ldots b_k \ldots b_P) \quad (1)$$

The outputs $y_1, \ldots y_P$ of each lode on layer $L_P$ are acquired by substituting equation (1) to the activation function h ($u_k$).

The model is constructed by generalized nodes as described above assembled on multiple layers. A model in this embodiment of the invention is therefore constructed by data describing at least the weights, biases, and activation functions for each layer.

The activation functions may be of many types, including Sigmoid functions, hyperbolic functions (tan h), ReLU (Rectified Linear Units), Softmax functions, or other functions, but a nonlinear function is preferable. Other conditions required for machine learning, including parameters such as the type of optimization algorithm or learning rate, may also be included. The number of layers, number of nodes, and connections between layers may also be defined in various ways.

In this embodiment of the invention the model is constructed using the image data of the scanned image as the input data to the input layer Li, and outputting output data indicating the settings from the output layer Lo. For example, the example in FIG. 8 supposes a model in which the input data to each node of the input layer Li is a (value standardizing) the gradation value of each pixel in the image data, and the output data from the output layer Lo indicates a setting.

An example of a configuration that outputs a setting is a configuration that assigns the selection options of settings for each setting item to each node, and assumes that as the output value corresponding to each selection option increases, the suitability of that selection option as a setting increases. More specifically, when there are five selection options for a given setting item, and the output values of the first to fifth selection options are 0.005, 0.8, 0.1, 0.015, 0.08, the selection options are considered appropriate in the order of the second selection option, third selection option, fifth selection option, fourth selection option, and first selection option.

Of course part of the model shown in FIG. 8 may be expressed by known functions, the remainder as unknown functions, and the unknown functions as the learning targets. In any event, a model for predicting settings from image data can be trained by constructing a model that takes image data as the inputs and outputs the final settings.

Step S200 in the flow chart shown in FIG. 7 acquires a training model. Training indicates the learning target. More specifically, the training model takes image data as the input and outputs a setting, but the relationship between image data and setting is not initially accurate. That is, the number of layers configured by the nodes and the number of nodes in the training model can be defined, but the parameters (the weight and bias, for example) defining the relationship between the input and output are not optimized. These parameters are to be optimized (that is, trained) in the process of machine learning.

The training model may be predefined, or may be acquired by the user operating and inputting to the touch panel of the display device 30. In either case, the processor 10 acquires the parameters of a neural network that outputs settings based on image data is acquired as a training model as shown in FIG. 8.

Next, the processor 10, by a function of the learning module 10g, acquires training data (step S205). In this embodiment, the training data 20b is generated in advance as described above, and is stored in nonvolatile memory 20. The processor 10 therefore references the nonvolatile memory 20 to acquire the training data 20b.

Next, the processor 10, by a function of the learning module log, acquires test data (step S210). In this embodiment, part of the training data 20b is extracted as the test data. The test data is not used for training.

Next, the processor 10, by a function of the learning module 10g, determines the initial value (step S215). More specifically, the processor 10 assigns an initial value to the variable parameters in the training model acquired in step S200. The initial values may be determined in many ways. For example, a random value or zero may be used, or the initial values may be determined considering different weights and biases. The initial values may also be adjusted by optimization of the parameters in, the learning process.

Next, the processor 10, by a function of the learning module 10g, learns (step S220). More specifically, the processor 10 inputs the training data 20b acquired in step S205 to the training model acquired in step S200, and calculates an output indicating a setting. The processor 10 also identifies a difference by means of a loss function that indicates the difference between the output setting and the setting indicated by the training data 20b. The processor 10 then repeats a specific number of times a process of updating the parameters based on differentiation using the parameters of the loss function.

For example, using the model shown in FIG. 8, the processor 10 inputs the gradation values of the image data (Ri, Gi, Bi) (where Ri, Gi, Bi are the image data of the red, green, and blue channels) of image i indicated by the training data 20b acquired in step S205 to the neural network of layer $L_i$. The example shown in FIG. 8 supposes that image data (Ri, Gi, Bi) is input to layer $L_i$. Therefore, the number of nodes $I_{i1}$-$I_{iM}$ of layer $L_i$ is the pixel count of the image data times the number of channels.

The processor 10 then applies a process of multiplying the input by the weight, adding bias, and applying an activation function to each layer and acquiring the output value ($T_{i1}$-$T_{iO}$). The information indicating the setting correlated to the training data 20b is 1 for a setting that was actually selected for a setting item, and otherwise 0. For example, if there are five selection options for a given setting item, and the selection option that was actually selected from among the first to fifth selection options is the second selection option, then the values 0, 1, 0, 0, 0 are correlated to the first to fifth selection options. This information is represented here as ($t_{i1}$-$t_{iO}$).

If the output of the training model is $T_i$, and the setting the training data 20b indicates is $t_i$, the loss function of image data i can be expressed as L ($T_i$, $t_i$). Other loss functions can obviously also be used, including, for example, a cross entropy error function.

The process of calculating this loss function L is applied to all image data indicated by the training data 20b, and the loss function in one learning cycle is expressed as an average or total sum of the loss functions. For example, when the loss function is expressed by a sum, the overall loss function E is represented by equation (2) below.

$$E = \sum_i L_i(T_i, t_i) \quad (2)$$

When loss function E is acquired, the processor 10 updates the parameters by on a defined optimization algorithm, such as by a stochastic gradient descent.

When the parameters are updated the specific number of times, the processor 10 determines whether or not generalization of the training model is completed (step S225).

More specifically, the processor 10 inputs the image data indicated by the test data acquired in step S210 to the training model, and acquires output indicating a setting. The processor 10 then acquires the degree that the output setting matches the setting indicated by the test data. In this embodiment, the processor 10 determines that generalization is completed when the degree the settings match is greater than or equal to a specific threshold.

Note that in addition to evaluating generalization, the appropriateness of hyperparameters may also be validated. For example, in a configuration in which hyperparameters, which are variables other than weight and bias, such as the number of nodes, are chained, the processor 10 may validate the appropriateness of the hyperparameters based on validation data. The validation data may be extracted from the training data by a process similar to step S210. Like the test data, the validation data is not used for training.

If step S225 determines that generalization of the training model is not completed, the processor 10 repeats step S220. More specifically, the weight and bias are updated.

However, if step S225 determines that generalization of the training model is completed, the processor 10 records a trained model (step S230). More specifically, the processor 10 records the training model as a trained model 20c in nonvolatile memory 20.

The configuration described above can train a model that automatically derives settings appropriate to an image. By inputting desired image data to the trained model 20c, and outputting information indicating settings, the settings appropriate to a desired image can be predicted. In addition, by comparing the output values for the same setting item, the degree of appropriateness of a selection option for a setting item can be evaluated based on the magnitude of the output values.

A multifunction device 1 according to this embodiment can apply settings predicted to be appropriate by machine learning, and execute processes involving scanning. More specifically, the processor 10 can receive commands to apply settings predicted by machine learning based on the user's touch operations on the display device 30. When such commands are received, the processor 10 controls the scanner 60 to pre-scan the set document set on the document platen.

The processor 10 then inputs the image data acquired by the pre-scan to the trained model 20c, and calculates the settings (first settings) for each setting item based on the acquired output values. When first settings are acquired, the processor 10, by a function of the executor 10e, controls the printer 50 to execute a process involving the scanner based on the first settings.

Note that in the process involving scanning the image data acquired by the pre-scan may be used, or image data acquired by rescanning based on the first settings may be used.

By deriving settings using a trained model 20c, the configuration described above can make settings related to a process accompanying scanning without requiring user intervention. User convenience and ease of use can therefore be improved.

Note that the first settings acquired by machine learning may also be used to display a user interface. More specifically, when the processor 10 displays a user interface on the display device 30 by a function of the display controller 10b, the processor 10 may be configured to set the order of preference of settings included in the first settings higher than the defined order, and display a screen enabling the user to select multiple settings displayed in positions corresponding to the order of preference.

More specifically, the processor 10, by a function of the display controller 10b, controls the scanner 60 to make a pre-scan in response to a document being set on the scanner 60. When the processor 10 inputs the image captured by the pre-scan to the trained model 20c, first settings predicted to be appropriate to the scanned image are output. The processor 10 then sets the preference order of the first settings above the defined order (such as first preference), and when displaying a new user interface or refreshing the display, displays the selection options according to the set order of preference. In this case, the selection options of the first settings may be the selection options that are selected by default.

The processor 10 then receives the user selections through the user interface, and executes a process accompanying scanning based on the selected settings. This configuration enables executing a process accompanying scanning using the desired settings as a result of the user selecting settings displayed in the order of preference.

(4) Other Embodiments

The invention is described with reference to desirable embodiments above, but the invention is not so limited and can be varied in many ways. For example, the display controller may be a device other than a multifunction device, such as a table terminal, smartphone, or other common computing device. In addition, the method whereby the order of preference of settings is adjusted without the user making a selection as described above may also be expressed as a program invention or a method invention.

The foregoing embodiment also describes settings related primarily to a copier function, but the invention can also be embodied to configure settings related to other processes accompanying scanning, such as scanning and saving the scanned data in memory.

Copying can also be accomplished by the multifunction device that made the scan printing, or the multifunction device that made the scan sending the scanned data by a fax protocol or e-mail protocol to a different device for printing.

In addition, embodiments in which the scanning settings themselves are included in the first settings, and embodiments in which only settings related to other processes not including the actual scanning (such as printing or sending the image data by fax), are conceivable.

Furthermore, when the display controller is a device other than a multifunction device, embodiments that configure the settings for that device are also conceivable.

When there are multiple processes accompanying scanning, different operations are possible before and after the user selects what processes to execute. More specifically, if copying (first process) and sending a fax (second process) are available as processes accompanying scanning, and the user can select either process, and placement of a document in the scanner is detected before the user selects which process the user wants to run, pre-scanning the document may be triggered by the document being set, and first settings including setting whether to make a copy or send a fax can be set. This is obviously predicated on the training data including a setting indicating which process was executed for the settings corresponding to the scanned image, the copier process or fax sending process, and in the machine learning process learning a setting including the setting indicating which process to execute.

In addition, if copying (first process) and sending a fax (second process) are available as processes accompanying scanning, the user can select either process, and placement of a document in the scanner is detected after the user selects which process the user wants to run, the first settings can be made based on the results of learning the settings for each process by machine learning using training data that applies the settings in the selected process as the settings corresponding to the scanned image, and the process selected by the user can be executed.

The user interfaces described above are simply examples, and may be varied in many ways insofar as the selection options for settings are displayed in an order of preference. For example, a user interface that displays the selection options in an order of preference, and toggles the selection options displayed in the next order of preference each time the user makes a selection, is possible. There may obviously also be three or more candidates for the changing selection options.

Functions described in the accompanying claims may obviously be embodied by hardware resources of which the function is determined by the configuration itself, hardware resources of which the function is determined by a program, and by combinations of these. The function of each part is also not limited to embodiments of physically discrete hardware resources. A single hardware resource may embody multiple functions, or multiple hardware resources may embody a single function.

The foregoing embodiment is also only one example, parts of the configuration may be omitted, other configurations may be added, and parts may be replaced by other parts.

The display controller may be configured in many ways enabling displaying a user interface for selecting one of N (where N is an integer of three or more) selection options. More specifically, the display controller must be able to provide selection options to a user by displaying icons or other images on a display device. The selection options are objects to be selected by the user, and the number of selection options may be two or more.

When selections are made for multiple items, the selection options for each item are provided through a user interface. The form of the user interface may take various shapes, and is not limited to displaying and touching on a touch panel display. For example, the user interface may configured by a display, keyboard, mouse, or other input devices, or the user interface may be configured to enable selecting by voice selection options that are provided by speech. The display controller may also be integrated with the device (such as the display device) providing the user interface, or it may be a separate device.

The extractor may be configured in various ways enabling extracting M (where M is an integer greater than or equal to 2 and less than N) selection options including the currently selected option from among N selection options according to the order of preference. More specifically, the extractor may simply enable extracting a subset of selection options from among all selection options. The extracted M selection options are the selection options to be displayed, and may be less than N, which is the number of all selection options (when there are multiple items, all selection options for each item). The number of extracted M selection options may therefore be adjusted according to the size of the display area for the selection options in the first display screen.

The order of preference is simply the order defining the display sequence of the selection options, and may be fixed or variable. In either case, the order of preference is determined to improve user convenience and ease of use. For example, configurations in which the order of preference is determined so that the order of preference increases as the likelihood of a selection option being selected increases is possible.

The display controller may be configured in any way enabling displaying a first display screen including the extracted M selection options selectable at positions corresponding to the order of preference and not selectably including the remaining selection options, displaying a second display screen that is called in response to an operation on the first display screen and selectably includes the remaining selection options, and displaying the selection option selected in the second display screen as the currently selected option in the first display screen.

More specifically, the display controller provides a user interface for selecting selection options by displaying selection options in a first display screen, and provides another user interface enabling selecting from a second display screen selection options that are not displayed in the first display screen. Furthermore, because when a selection option is selected on the second display screen the selected selection option becomes the currently selected option, the display controller can display the selection option that was selected as the currently selected option in the first display screen.

The first display screen and the second display screen are simply different windows in the user interface, and configurations that exclusively display one or the other (one is not displayed when the other is displayed), and configurations that display the second display screen overlaid to the first display screen so that the second display screen and part of the first display screen are displayed at the same time, are possible.

The operation calling the second display screen is an operation that is performed when the first display screen is displayed, or it may be an operation of an operator other than an icon included in the first display screen. For example, the operation may be operating an input device such as a keyboard or mouse.

Note that a selection option being selectably included at a position corresponding to the order of preference means that the selection options are displayed in an order of preference and the selection options can be selected. The position corresponding to the order of preference is obviously also not limited to positions in a descending order of preference from left to right.

The setting target device is any device to which settings are applied, and may be various kinds of devices other than a multifunction device described above. For example, the setting target device may be a printer and scanner, a fax machine, a digital still camera, a digital video camera, other configuration. Photographs taken by a digital still camera or a digital video camera are a type of scan. When video images are captured by a digital still camera or a digital video camera, the image in a specific frame may be the pre-scan, and if the picture in the next frame is taken with the first settings based on the picture in the specific frame, the picture in the next frame may be treated as a scan based on the first settings.

The settings are any parameters used when executing a desired process on the setting target device, and when the parameters are variable when executing a process on the setting target device, the parameters are also examples of settings.

The mechanical state of the setting target device is, for example, the state of a part of the setting target device, and is a state that can be changed by applying a physical force to the change the position, for example, of a part of the setting target device.

Therefore, if the size of the document stored in a tray, which is a component of the setting target device, changes, there is a change in a mechanical state. Other changes in the mechanical state include the presence of an attachment used with the setting target device, and change in the position of a slider disposed to limit the set document size in the scanner.

Selection options that can cause the setting target device to operate without a change in a mechanical state include selection options indicating settings for executing a process using the documents stored in the tray, and selection options indicating settings are used without moving a slider.

The first ratio may be a ratio for scaling from the set document size to the output document size. Therefore, the first ratio may change dependently on the size of the set document that is set in the scanner, and the size of the output document that is printed by the printer.

Because the set document size is the size of the document that is actually set in the scanner, the size will be determined if a document is set in the scanner. However, if the output document size can be selected from among multiple sizes in a step before copying, the output document size is variable. As a result, there may be multiple first ratios.

When there may be multiple first ratios, the ratio assuming the selected size will be output document size may be used as the first ratio, and when the documents stored in multiple trays are assumed to be copied to the output document size, multiple ratios may be set as the first ratio.

However, because the second ratio is a ratio different from the first ratio, all ratios other than the first ratio will be second ratios if there is only one first ratio, and if there are multiple first ratios, any ratio that is not one of the first ratios is a second ratio.

The display controller may be configured in any way enabling displaying at least the second ratio on the screen (the first display screen in the embodiment described above) at an order of preference higher than the defined order. More specifically, the position when displaying a ratio as a selection option is determined based on the order of preference, and there is a defined order to the order of preference. The defined order may follow various rules, such as a fixed order, or a rule that increases the preference order based on how recently a selection option was used, for example.

In any case, the preference order of the second ratio must increase to a level of preference greater than the defined order.

The copy ratio may be any ratio that is used when making an actual copy in a multifunction device or photocopier, and when a ratio is selected and a command to make a copy is asserted to the copier, that selected ratio is the copy ratio.

The configurator may be variously configured to enable deriving the first settings corresponding to an image captured in a pre-scan based on the learning results of machine learning using training data related to the settings of a process accompanying scanning that is applied to the scanned image, and making the settings of the process accompanying scanning the first settings. More specifically, the configurator is configured to predict and set settings appropriate to an image based on learning results acquired by machine learning.

The process accompanying scanning may be any process involving scanning, and may be scanning itself, may be copying that prints the scanned image, may be sending a fax of the scanned image, or other process. The training data is data used for machine learning, and includes is data relating data representing the scanned image to settings used in a process that involves scanning and is based on the scanned image data. Because the training data is data used for machine learning, combinations of images and settings defined for multiple images are used as training data.

The settings related to the images may include all selectable settings or only a subset.

The relationships between images and settings may be any relationship to be learned. Therefore, settings related to an image may be defined as settings actually applied to a process accompanying scanning, settings applied when executing a process accompanying scanning, or in other ways.

Within the scope enabling machine learning, noise, such as data related to mistaken image settings, may also be included in the numerous training data.

The machine learning must enable learning relationships between images and settings. More specifically, the machine learning must enable training a model that outputs settings of a process accompanying scanning based on image input. Various machine learning methods may be used. More specifically, the machine learning must enable building a model that outputs settings for a process accompanying scanning based on input image data or values derived from image data, and learning to minimize the difference between the settings output by the model and the settings in the training data.

Various elements may be appropriately selected for machine learning by the neural network, including: the number of layers and number of nodes in the model; the type of activation function; the type of loss function; the type of gradient descent; the type of gradient descent optimization algorithm; the type of mini-batch and number of batches; learning rate; initial values; type of overfitting prevention method and if overfitting prevention is used; whether there is a convolution layer; size of filter for convolution; type of filter; type of padding and stride; type and presence of pooling layer; presence of a fully connected layer; and the presence of a recursive structure. Other types of machine learning can obviously also be used, including a support vector machine, clustering, and reinforcement learning.

Machine learning that automatically optimizes the structure of the model (such as the number of layers and number nodes per layer) may also be used. Learning may also be divided into multiple steps. For example, a configuration that uses machine learning to learn features of images from image data, and machine learning to learn settings from the image features, is possible. In a configuration in which machine learning is done on a server, training data may be collected from multiple clients, and machine learning may be based on the collected training data.

A pre-scan is a scan that is made before the process accompanying scanning ends, and whether or not the image captured by the pre-scan is displayed for the user is not limited. Pre-scanning may also repeat multiple times. When multiple pre-scans are taken, the image captured by the pre-scan is one of the multiple images, such as the image captured by the last pre-scan.

The first settings are any settings determined by the output of machine learning, and may be all selectable settings or a subset thereof. When a subset, the settings required for processing may be determined by another method, such as based default settings or a history of past settings.

The executor 10e executes a process accompanying scanning based on the first settings. More specifically, when the first settings for the image captured by a pre-scan are derived by machine learning, the first settings can be applied to the image to execute the process accompanying scanning.

In addition, the sequence of the selection options in the screen where the user selects settings may also be set by deriving i-th settings (where i is an integer of 2 or more) other than the first settings by machine learning as settings with a high order of likelihood, and setting the order of preference in descending order of likelihood.

For example, if when the generalization process ends there are five selection options for a given setting time, and the output values of the first to fifth selection options are 0.005, 0.8, 0.1, 0.015, 0.08, the second selection option is a first setting, the third selection option is a second setting, the fifth selection option is a third setting, the fourth selection option is a fourth setting, and the first selection option is a fifth setting. The selection options are then arranged in the order of the currently selected option, the second selection option, the third selection option, the fifth selection option, the fourth selection option, and the first selection option. This configuration also improves user convenience and ease of use.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanning system comprising:
    a scanner configured to perform one or more scanning-related processes, the processes selected from the group consisting of a pre-scan process, a copy process, a facsimile process, a full scanning process, an e-mail process, or a combination thereof; and
    a processor configured to:
        derive one or more settings from an image captured from a document by the pre-scan process based on a learning result generated by machine learning;
        receive a user indication of a first process to be performed by the scanner;
        when the user indication corresponds to loading a document without further user interaction to indicate the first process:
            cause the scanner to perform the pre-scan process and derive a first setting and a second setting, where the first setting indicates a learned process selected from the copy process, the facsimile process, the full-scan process, or the e-mail process and the second setting is specific to the learned process; and
            set the first process to the learned process;
        when the user indication corresponds to loading the document and user interaction to indicate the first process, the user interaction received either prior to loading the document or subsequent to loading the document:
            cause the scanner to perform the pre-scan process and derive the second setting specific to the first process;
            cause display of multiple selectable settings in the order of preference on the screen associated with the first process;
            increase the order of the second setting in the displayed selectable settings;
            receive user confirmation for execution of the first process with the displayed selectable settings; and
            cause the scanner to perform the first process using the displayed selectable settings.

2. The scanning system according to claim 1, wherein the machine learning includes when a displayed setting of any process is changed multiple times for the same image, the last setting made is related to the image as training data for the machine learning and a setting before the last setting is not used as training data.

3. The scanning system according to claim 1, wherein the machine learning includes when a displayed setting of any process is changed after multiple pre-scans, the last setting made is related to the pre-scanned image as training data for the machine learning and a setting before the last setting is not used as training data.

4. A non-transitory computer-readable storage medium storing a scanning program to cause a processor to:
    control a scanner configured to perform one or more scanning-related processes, the processes selected from the group consisting of a pre-scan process, a copy process, a facsimile process, a full scanning process, or a combination thereof;
    derive one or more settings from an image captured from a document by the pre-scan process based on a learning result generated by machine learning;
    receive a user indication of a first process to be performed by the scanner;
    when the user indication corresponds to loading a document without further user interaction to indicate the first process:
        cause the scanner to perform the pre-scan process and derive a first setting and a second setting, where the first setting indicates a learned process selected from the copy process, the facsimile process, the full-scan process, or the e-mail process and the second setting is specific to the learned process; and
        set the first process to the learned process;
    when the user indication corresponds to loading the document and user interaction to indicate the first process, the user interaction received either prior to loading the document or subsequent to loading the document:
        cause the scanner to perform the pre-scan process and derive the second setting specific to the first process;
    cause display of multiple selectable settings in the order of preference on the screen associated with the first process;
    increase the order of the second setting in the displayed selectable settings;
    receive user confirmation for execution of the first process with the displayed selectable settings; and
    cause the scanner to perform the first process using the displayed selectable settings.

* * * * *